3,545,964
Patented Dec. 8, 1970

3,545,964
GOLD RECOVERY PROCESS
Spenst M. Hansen, Denver, Colo., and David F. Snoeberger, Oakland, Calif., assignors to the United States of America as represented by the United States Atomic Energy Commission
No Drawing. Filed Apr. 18, 1968, Ser. No. 722,209
Int. Cl. C22b 11/04
U.S. Cl. 75—101                                    4 Claims

ABSTRACT OF THE DISCLOSURE

Process wherein fragmented or comminuted gold ore is contacted with an acidic chloride leach liquor containing sodium azide, ethanolamine, ethylene diamine or potassium thiocyanate as a covalent-bonding complexing agent in the presence of an oxidizing agent to leach gold from the ore. The leach liquor is circulated to a processing plant to recover the gold and the barren liquor is recycled. In the presence of such complexing agent greater proportions of the gold are leached and the leach liquor is stabilized against loss of the gold therefrom in the presence of ore thereby facilitating recovery of gold even from a low grade ore during long contact times.

---

The invention described herein was made under Contract No. W-7405-ENG-48 with the United States Atomic Energy Commission.

BACKGROUND OF THE INVENTION

Field of the invention

The invention relates to gold extraction and, in particular, to a method for the in situ leach recovery of gold from deposits of gold ore.

Description of the prior art

The most important process for recovering gold from its ores is the method known as "cyanidation" (see "Comprehensive Inorganic Chemistry," Sneed, Maynard, and Brasted, volume two, pages 195–206, D. Van Nostrand Co., 1954). The cyanidation process consists of leaching mined and crushed gold ore with dilute solutions of sodium cyanide and oxygen, thereby dissolving the gold as the complex ion $Au(CN)_2^-$, and then precipitating the gold by the addition of zinc or aluminum to the cyanide solution.

A second method of recovering gold from its ores is the "chlorination" process (see "Comprehensive Inorganic Chemistry," cited previously, pages 193–194). The gold ore is usually roasted to convert interfering materials, such as sulfides, into their corresponding oxides. The roasted ore is then leached with an aqueous solution of chlorine made by direct injection of the gas, or with reagents that react to form a chlorine solution in the moist ore. Gold dissolves in the chlorine solution as a complex ion $AuCl_4^-$, and is precipitated and recovered by treating the solution with $H_2S$.

Only a small fraction of known gold deposits can be economically mined using conventional recovery methods such as cyanidation and chlorination. Major reserves of "low-grade" gold ore cannot be profitably worked because of the high cost of mining and transporting the crushed ore. In an attempt to eliminate the need for handling large amounts of crushed ore, so-called "in situ leach" methods have been proposed (see Report UCRL-5253, "Industrial Uses of Nuclear Explosives," pages 32–35, Lawrence Radiation Laboratory, Livermore, Calif., Sept. 8, 1958). The ore deposit is first fractured and made permeable by the underground explosion of conventional or nuclear explosives. The permeable deposit is then leached in situ with a solution that extracts the desired metal from its ore. The metal-bearing ("pregnant") leach solution is pumped or otherwise transported to a processing location where the metal is recovered from solution. An inherent problem in the in situ leach method is that the leach solution comes into prolonged and intimate contact with the fractured ore. The chemical composition of most ores is so diverse that a number of undesirable chemical and physical reactions may take place between the dissolved metal in the leach solution and interfering materials in the ore. For example, sulfide ores may precipitate the dissolved gold and hence remove it from solution. Various clays and minerals commonly present in gold ores may physically adsorb the gold, once again decreasing the gold concentration in the leach solution. The problem of stabilizing the dissolved gold against such reactions has been a major obstacle to the widespread use of in situ leaching in the recovery of gold.

SUMMARY OF THE INVENTION

The present invention provides a novel improvement on the in situ leach method. A strong complexing agent is added to the leach solution to bind or "sequester" the dissolved gold in the form of an extremely stable complex, thereby permitting the leach solution to remain in prolonged contact with the ore deposit with little or no reaction between the dissolved gold and the interfering materials in the ore. The complexing agent so effectively stabilizes the gold that the leach solution can be repeatedly circulated through the ore deposit with no decrease in the amount of gold in solution. Tests run on representative samples of gold ore have been shown that the amount of gold in solution can be more than doubled (in one case tripled) by the addition of a complexing agent to the leach solution.

DESCRIPTION OF THE PREFERRED EMBODIMENT

As mentioned previously, the improvement provided by this invention comprises the addition of a strong complexing agent to the gold leaching solution. There are numerous complexing agents that form complexes with gold. However, in the course of testing various agents for effectiveness, it was discovered that those complexing agents which form covalent bonds with gold were most effective in stabilizing the gold against undesirable reactions with interfering materials in the ore. Some representative covalent-bonding complexing agents that were tested for the ability to stabilize gold in solution are the following: sodium azide, ethanolamine, ethylenediamine, and potassium thiocyanate. It should be understood that this listing of specific complexing agents is not intended to limit the invention in any way. Rather, it is intended to illustrate the large class of complexing agents that form covalent bonds with gold and which were found to be effective stabilizers of gold in solution.

The stabilizing ability of the various complexing agents was tested by making up a stock solution of gold chloride having the following composition: gold—45 micrograms per milliliter ($\mu$g./ml.); sulfuric acid—0.9 gram per liter; sodium chloride—2.6 grams per liter (the reason for including the sulfuric acid and sodium chloride will be explained later). Eight 350 ml. aliquots of the stock solution were taken; four of these aliquots were designated "control" and the remaining four aliquots were designated "test." Two grams of "millfeed" ore from Carlin, Nev., were added to each of the test aliquots. The "millfeed" ore was not added to the control aliquots. It had been shown by previous tests that the "millfeed" ore (a low-grade gold ore in which the gold occurs as finely divided particles in a siltstone matrix) caused a loss of more than 50% of the gold present in an "unstabilized" solution in one day, and nearly all the gold in ten days. To test the ability of the various complexing agents to stabilize gold in the presence of the "millfeed" ore, 0.35 gram of sodium azide were added to test aliquot #1, 0.35 gram of ethanolamine were added to test aliquot #2, 0.35 gram of ethylene diamine were added to test aliquot #3, and 0.35 gram of potassium thiocyanate were added to test aliquot #4. Similarly, the same amounts of these complexing agents were added to control aliquots #1, #2, #3 and #4. The pH of the eight aliquots was adjusted to 2, and the concentration of gold in solution was determined by atomic absorption spectrophotometry with a precision of ±2 µg./ml. The results of the test are shown below in Table I in which the gold concentration is given in µg./ml. after one day and after eight days.

TABLE I

| Control (no ore added) | Au conc. (1 day) | Au conc. (8 days) |
| --- | --- | --- |
| Stock gold soln | 45.0 | 45.0 |
| Sodium azide | 45.0 | 45.0 |
| Ethanolamine | 45.8 | 44.4 |
| Ethylenediamine | 46.4 | 45.0 |
| Potassium thiocyanate | 42.9 | 42.9 |

| Test (ore added) | Au conc. (1 day) | Au conc. (8 days) |
| --- | --- | --- |
| Stock gold soln | 18.0 | 5.3 |
| Sodium azide | 33.0 | 17.1 |
| Ethanolamine | 31.0 | 22.2 |
| Ethylenediamine | 19.9 | 13.6 |
| Potassium thiocyanate | 25.6 | 24.6 |

The data in Table I show that the complexing agents tested were very effective in stabilizing the gold in the presence of the "millfeed" ore. Specifically, the gold concentration of the stock solution (no added complexing agent) fell to 5.3 µg./ml. after eight days in contact with the "millfeed" ore. This corresponds to a gold loss of about 90% (original gold concentration was 45 µg./ml.). The gold concentrations in the aliquots with complexing agent added were from 3 to 5 times greater than the concentration with no added complexing agent.

In addition to a complexing agent, the leach solution must also contain an oxidant to convert the gold from the Au° state to the Au$^{+3}$ state. Various oxidants are suitable for use in the present method. However, in a practical gold recovery process, economic reasons dictate that the oxidant be cheap and easily available. Sodium hypochlorite, hydrogen peroxide, and manganese dioxide were tested for their ability to dissolve gold leaf. In an acid environment (pH 0.5 to 5.0) sodium hypochlorite consistently dissolved 0.5 gram of gold leaf in 24 hours, whereas the hydrogen peroxide and manganese dioxide dissolved a maximum of 0.03 gram of gold in times up to 184 hours. The hypochlorite oxidant is thus much more effective than either of the other two oxidants tested. The tests also showed that the hypochlorite concentration could be varied within wide limits without any decrease in gold-dissolving ability. Specifically, the concentration of hypochlorite was varied between 0.1 and 1.0 molar (7.4 and 74 grams/liter) with no apparent decrease in the weight of gold dissolved.

It was found that the present leaching method works best if the leach solution is maintained in the pH range of 0.5 to 5.0. Consequently, the leach solution must contain sufficient mineral acid (such as sulfuric acid) to maintain the pH within this range. Tests on the dissolving of gold leaf by a typical leach solution showed that the dissolving rate decreased rapidly when the pH of the solution rose above 5. These same tests also showed that maximum dissolving occurred at a pH between 1.8 and 2.2. Another reason for keeping the leach solution in the acid pH range is that alkaline solutions tend to make ore deposits less permeable by plugging them up. The effect of pH on the dissolving rate of gold leaf is shown in Table II. The maximum dissolving rate at a pH of about 2 is evident.

TABLE II

| pH: | Wt. gold dissolved after 15 min. (milligrams) |
| --- | --- |
| 1.3 | 27 |
| 1.6 | 68 |
| 2.3 | 118 |
| 3.0 | 89 |
| 4.2 | 29 |

As a result of tests using leach solutions containing high concentrations of chloride ions in addition to a complexing agent, it was found that gold losses were reduced if the leach solution contained excess chloride ions (Cl$^-$). The specific reasons for this effect are not known, but a possible explanation is that the formation of AuCl$_4^-$ in solution facilitates the action of the complexing agent in the leach solution.

The use of the present gold recovery process in leaching gold values from a representative gold ore is illustrated in the following examples.

EXAMPLE I

Gold ore from the Eldorado Mining District, Clark County, Nev., was crushed to less than 0.5-inch particle size and loosely packed into a 2.5-inch (I.D.) column without screening to a height of about 45 inches. The total weight of ore in the column was 5,415 grams, containing about 0.071 gram of gold based on initial assay. The packed column was flooded with a leach solution having the following composition: sodium chloride—25 grams per liter; sulfuric acid—5 grams per liter; sodium hypochlorite—7.5 grams per liter. The pH of the leach solution was 2.1. After the column was flooded, a downward circulation of the leach solution through the column was maintained at about 20 ml. per minute from a reservoir containing the solution. The initial total volume of leach solution was 4,400 ml. (void volume in the ore was about 900 ml.). Aliquot samples of the recirculated leach solution were periodically taken, and the gold concentration in the samples was measured by atomic absorption spectrophotometry. Over a period of 10 days' continuous leaching, the gold concentration averaged about 4 µg./ml. 0.85 gram of ethanolamine (about 10 times the total weight of gold in the ore) was then added to the reservoir containing the leach solution. A sample taken 25 minutes after addition of the ethanolamine contained 9.2 µg./ml. of gold, a concentration more than double that obtained before the ethanolamine addition. The gold concentration in the leach solution ceased fluctuating and stabilized at 8 to 9 µg./ml. during continuance of the leaching for one week.

EXAMPLE II 5,255 grams of gold ore (less than 20 mesh particle size) from Carlin, Nev., was packed into a 2.5-inch (I.D.) column to a height of about 45 inches. The total weight of gold in the ore was 0.0486 gram, based on preliminary assay. The packed column was flooded with a leach solution having the same composition as in Example I, and an upward circulation of the leach solution through the column was maintained at about 10 ml. per minute. The initial total volume of the leach solution was 4,000 ml. Reaction with the ore caused the pH of the leach solution to increase to between pH 5 and 6.5. To investigate leaching at a pH near 2.0, it was necessary to add sulfuric acid to the leach solution over a period of several days. Two samples of the solution taken 12 days apart (after the pH reduction) had gold concentrations of 2 and 3 µg./ml. 2.2 grams of ethanolamine were then added to the leach solution. Gold concentration rose rapidly to 9 µg./ml., a concentration three times greater than that obtained before the ethanolamine addition.

Gold dissolved in the leach solution may be recovered by one of several methods. The solution may be passed through an ion exchange column in which an anion exchange resin removes the dissolved gold. Other methods of recovering dissolved gold are well known and documented in books on inorganic chemistry.

It is to be understood that, although the leaching medium of this invention has been described as a "solution," it is intended that this term embrace other leaching media which may not technically be true solutions. For example, the leaching medium may be a suspension, an emulsion, or other fluid medium.

Although a preferred embodiment of the invention has been described, this is solely intended to be illustrative, and various modifications may be made therein without departing from the spirit and scope of the invention as defined in the following claims.

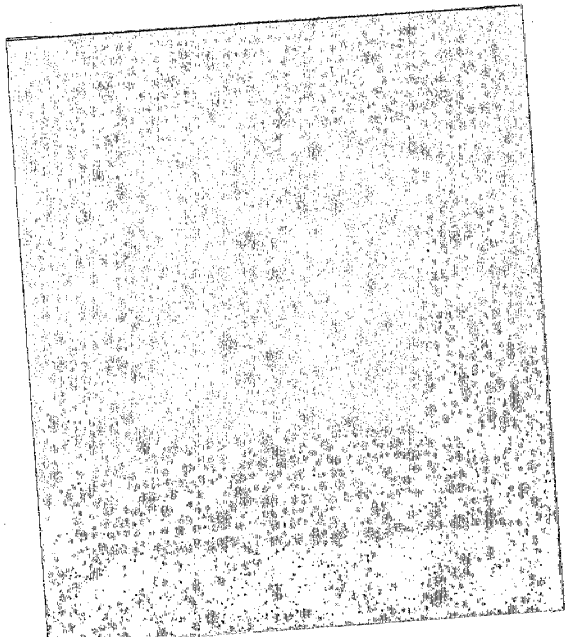

We claim:
1. A method for recovering gold values from a permeable quantity of gold-bearing ore comprising the steps:
   (a) contacting said core with an acidic aqueous chloride leach liquor containing a covalent-bonding complexing agent selected from the group consisting of sodium azide, ethanolamine, ethylenediamine, and potassium thiocyanate in the presence of an oxidizing agent selected from the group consisting of sodium hypochlorite, manganese dioxide, and hydrogen peroxide to leach gold from said ore in the form of a stable covalently bonded gold complex dissolved in said solution,
   (b) separating the pregnant leach solution from the ore, and
   (c) recovering the gold values from said pregnant leach solution.
2. The method of claim 1 wherein said acidic chloride leach liquor comprises an aqueous solution of about 25 grams per liter of sodium chloride, 7.5 grams per liter of sodium hypochlorite and about 5 grams per liter of sulfuric acid together with said covalent bonding complexing agent in a concentration sufficient to form a covalently bonded complex with gold values in said leach solution.
3. The method of claim 1, wherein said leach solution is maintained at a pH of between 0.5 and 5.0.
4. The method of claim 3, wherein said permeable quantity of ore is an in situ deposit of gold ore made permeable by means of the explosion of a nuclear device implanted therein.

References Cited

UNITED STATES PATENTS

| | | | |
|---|---|---|---|
| 738,758 | 9/1903 | Alzugaray | 75—101 |
| 971,252 | 9/1910 | Clancy | 75—101 |
| 1,734,306 | 11/1929 | Schraps | 75—105 |
| 2,777,764 | 1/1957 | Hedley et al. | 75—105 |
| 2,839,387 | 6/1958 | Burton | 75—118 |
| 3,317,313 | 5/1967 | Büggs et al. | 75—118 |
| 565,342 | 8/1896 | Frasch | 299—5X |
| 2,660,554 | 11/1953 | Ostrow | 260—429UX |
| 2,896,930 | 7/1959 | Menke | 75—101X |
| 2,950,964 | 8/1960 | Forward et al. | 75—103 |
| 3,150,960 | 9/1964 | Hunter | 75—101X |
| 3,278,232 | 10/1966 | Fitch et al. | 75—103X |
| 3,465,818 | 9/1969 | Dixon | 299—13X |
| 3,475,163 | 10/1969 | Watson et al. | 75—101 |

L. DEWAYNE RUTLEDGE, Primary Examiner

G. T. OZAKI, Assistant Examiner

U.S. Cl. X.R.

23—75; 75—118; 260—430; 299—5, 13